(12) United States Patent
Greer

(10) Patent No.: US 7,779,500 B1
(45) Date of Patent: Aug. 24, 2010

(54) ADAPTER WITH MULTIPLE ATTACHMENTS FOR RECIPROCATING HANDHELD POWER TOOLS

(76) Inventor: Gary C. Greer, 4599 Arboga Rd., Olivehurst, CA (US) 95961

( * ) Notice: Subject to any disclaimer, the term of this patent is extended or adjusted under 35 U.S.C. 154(b) by 384 days.

(21) Appl. No.: 10/956,904

(22) Filed: Sep. 30, 2004

Related U.S. Application Data

(60) Provisional application No. 60/508,461, filed on Oct. 2, 2003.

(51) Int. Cl.
*B23B 31/107* (2006.01)

(52) U.S. Cl. ............................. 15/22.2; 15/22.1; 15/145

(58) Field of Classification Search .................. 15/22.2, 15/22.1, 145; 279/143–145; 30/392, 500; 451/356
See application file for complete search history.

(56) References Cited

U.S. PATENT DOCUMENTS

| | | | | | |
|---|---|---|---|---|---|
| 3,008,165 | A | * | 11/1961 | Scholl | 15/176.5 |
| 4,893,437 | A | * | 1/1990 | Doherty | 451/356 |
| 6,120,363 | A | * | 9/2000 | Dunn | 451/356 |
| 6,142,715 | A | * | 11/2000 | Fontaine | 407/29.1 |
| 6,237,179 | B1 | * | 5/2001 | Balceiro | 15/22.2 |
| 6,755,424 | B1 | * | 6/2004 | Paulsen | 279/145 |

* cited by examiner

*Primary Examiner*—Shay L Karls
(74) *Attorney, Agent, or Firm*—Glen L. Gross; Shlesinger, Arkwright & Garvey LLP

(57) ABSTRACT

A construction worker may adapt a reciprocating handheld power saw to multiple additional applications including brushing, scraping, sanding, and polishing. A simple adapter is attached to the power tool in place of a saw blade. Multiple attachments for the various applications are easily press-fit onto the adapter.

17 Claims, 3 Drawing Sheets

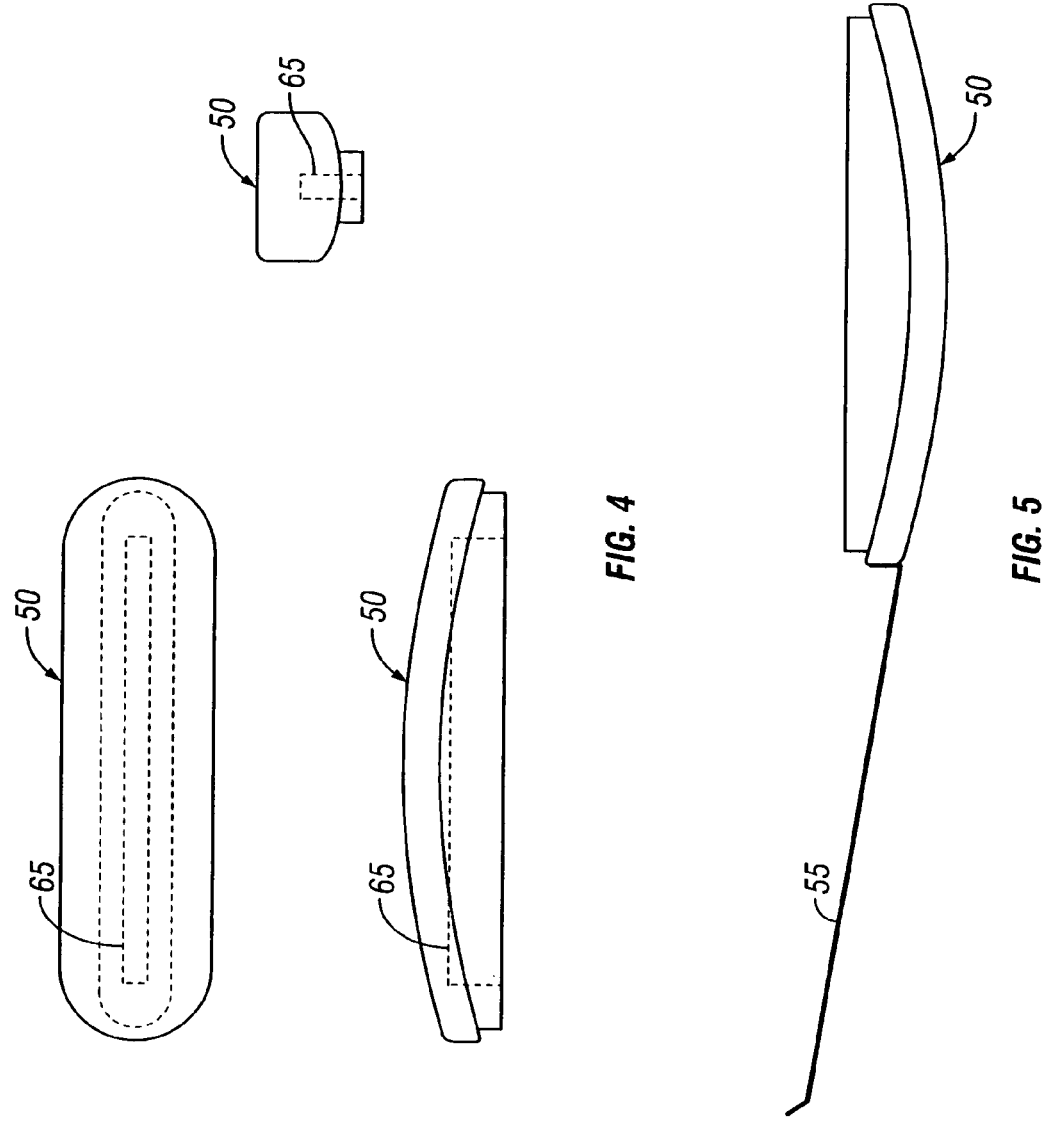

ADAPTER WITH MULTIPLE ATTACHMENTS FOR RECIPROCATING HANDHELD POWER TOOLS

CROSS-REFERENCE TO RELATED APPLICATION

This application claims the benefit of U.S. Provisional Application No. 60/508,461, filed Oct. 2, 2003.

BACKGROUND OF THE INVENTION

1. Field of the Invention

The present invention relates to the field of handheld power tools, specifically to the adaptation of linearly reciprocating handheld power tools to multiple uses.

2. Prior Art

A reciprocating handheld power saw is a tool that is widely used by plumbers, electricians, carpenters, and other workers in the construction industry. (See, for example, the listing for Milwaukee 10 Amp Sawzall Reciprocating Saw in "Milwaukee Product Catalog", Milwaukee Electric Tool Corporation, [retrieved on 2003 Aug. 21], retrieved from <URL:http://www.milwaukeeconnect.com/html/index.html>.) The saw blades of such tools are generally removable. This makes it possible to apply the linearly reciprocating motion of such a power tool to other applications besides cutting with a saw.

In U.S. Pat. No. 6,142,715, "File Adapter for Power Saw Tool", to Fontaine, a reciprocating handheld power tool is adapted to become a power filing device. The disclosed apparatus requires two points of connection between the filing adapter and the power tool. A bar holding the file is connected to the reciprocating portion of the power tool. A bracket for guiding the reciprocating file is connected to the body of the power tool. The result is a relatively complex construction dedicated to the application of power filing.

In U.S. Pat. No. 4,893,437, "Power Sanding Adapter for Jigsaws", to Doherty, a reciprocating handheld power tool is adapted to scrape or sand wallpaper from a wall. The disclosed apparatus requires two points of connection between the sanding adapter and the power tool. A bar holding a scraping or sanding head is connected to the reciprocating portion of the power tool. A bracket for guiding the reciprocating portion and providing additional hand-holds is connected to the body of the power tool. The result is a relatively complex construction dedicated to the application of scraping or sanding.

Each of the two patented inventions described above are dedicated to a narrow range of application. Each requires a relatively complex connection to a power tool so that reconfiguration of the power tool for multiple different applications in the field is cumbersome and inconvenient.

3. Objects and Advantages

The present invention adapts a linearly reciprocating handheld power tool to multiple applications including brushing, scraping, sanding, and polishing. It requires only a single point of connection between an attachment and the power tool. It enables very fast and convenient reconfiguration for the multiple supported applications.

SUMMARY OF THE INVENTION

An adapter connects to a reciprocating handheld power tool at the single point of connection typically used to attach a saw blade. The adapter provides a flange that fits into multiple different application attachments using a simple and convenient press-fit mechanism.

BRIEF DESCRIPTION OF THE DRAWINGS

FIG. 4 is three views of the base of an attachment.

FIG. 5 is a scraper attachment.

DETAILED DESCRIPTION OF THE PREFERRED EMBODIMENTS

Structure and Operation

The present invention adds multiple additional functions to a reciprocating handheld power tool, such as the Milwaukee Sawzall. (See, for example, the listing for Milwaukee 10 Amp Sawzall Reciprocating Saw in "Milwaukee Product Catalog", Milwaukee Electric Tool Corporation, [retrieved on 2003 Aug. 21], retrieved from <URL:http://www.milwaukeeconnect.com/html/index.html>.) These tools are principally used with saw blades by construction workers for rough cutting applications.

Figure 1:
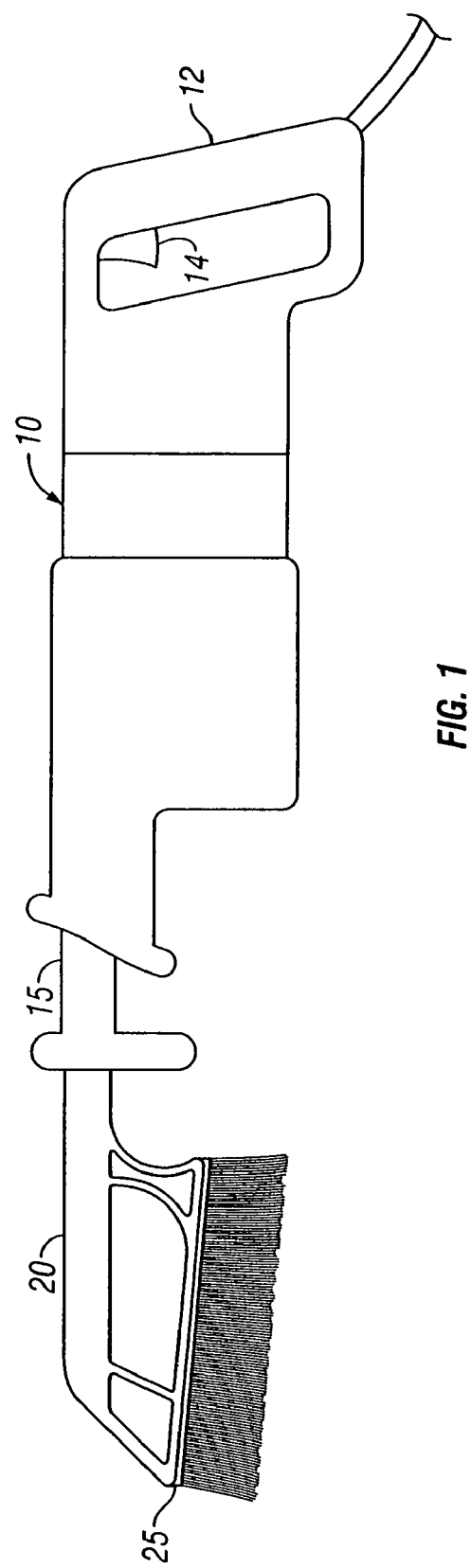
FIG. 1 is an adapter with a brush attachment connected to a reciprocating handheld power tool.

FIG. 1 shows a typical reciprocating handheld power tool 10 configured with a wire brush attachment 25 instead of a common saw blade attachment. An operator typically places one hand on a hand grip 12 at the rear of power tool 10, places the other hand under the middle of power tool 10, and presses a trigger 14. This activates the in-and-out motion of a reciprocating member 15 of power tool 10, which causes wire brush attachment 25 to move back and forth in a scrubbing action on any surface on which it is placed. Power tool 10 thus substitutes for the human muscle power applied in manual brushing. One important use for this configuration is the removal of old paint from woodwork or other surfaces.

Figure 2:
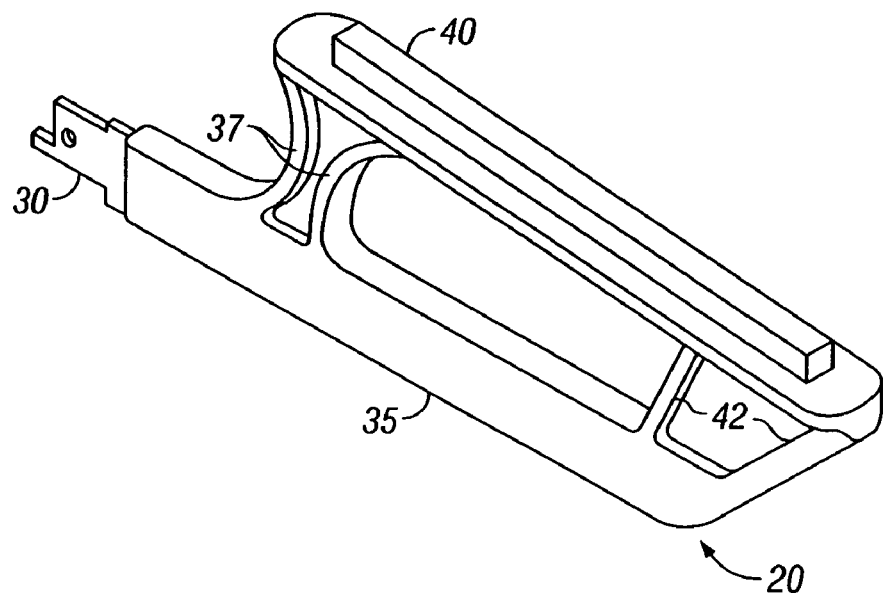
FIG. 2 is a perspective view of an adapter.

FIG. 1 shows that wire brush attachment 25 is connected to reciprocating member 15 using an adapter 20. Adapter 20 is shown separately in FIG. 2, displayed in an inverted position relative to FIG. 1. Adapter 20 has an overall length of 21 centimeters. It is fabricated from three parts: a flat metal blade 30, a main housing 35, and a flange molding 40.

Figure 3:
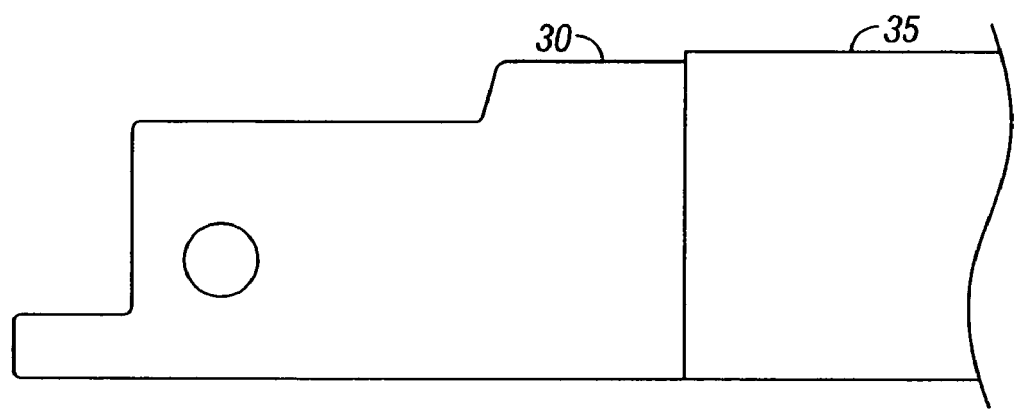
FIG. 3 is a close-up view of the universal tang protruding from the adapter where it connects to a reciprocating handheld power tool.

Blade 30 is 0.18 centimeters thick and 9.9 centimeters long. A length of 7.2 centimeters of blade 30 is molded inside housing 35. This portion of blade 30 is cut in a pattern of square teeth for firm anchoring. A length of 2.7 centimeters of blade 30 protrudes from housing 35. This portion of blade 30 fits into reciprocating member 15 using the de-facto standard shape and size of the ½-inch universal tang (or shank) used at the connecting end of all Sawzall blades and compatible with many products competitive with the Sawzall. (See, for example, the listing for Super Sawzall Blade, 6 Teeth per Inch, 9 in. Length, in "Milwaukee Product Catalog", Milwaukee Electric Tool Corporation, [retrieved on 2003 Aug. 21], retrieved from <URL:http://www.milwaukeeconnect.com/html/index.html>.) A close-up view of this end of blade 30 is shown in FIG. 3.

Main housing 35 is composed of molded plastic. The overall length of housing 35 is 18 centimeters. The width of housing 35 is 0.8 centimeters. Housing 35 uses two truss webs to support flange molding 40 and to handle the stress forces of operation. A heel web 37, which is closer to the connection to power tool 10, is composed of two curved plastic portions that protrude about 6.5 centimeters above the straight bottom portion of housing 35. A toe web 42, which is farther from the connection to power tool 10, is composed of two straight plastic portions that protrude about 5.0 centimeters above the straight bottom portion of housing 35.

Flange molding 40 has a flat base that is 0.7 centimeters thick by 2.0 centimeters wide by 14.5 centimeters long. Centered on the top of this base is a rectangular flange that is 0.6 centimeters tall by 0.6 centimeters wide by 12.0 centimeters long. Flange molding 40 is composed of plastic. Flange molding 40 is precision molded so that it will form a reliable press fit into a corresponding cavity 65 in base 50 (see FIG. 4) of wire brush attachment 25. Flange molding 40 may be rigidly fixed to truss webs 37 and 42 using glue, electrical welding, screws, or any other method that can handle the stress forces of operation. The plane of the flat base of flange molding 40 is angled six (6) degrees from the axis of reciprocation which runs through the length of flat blade 30 and the straight bottom portion of housing 35. This angle allows for comfortable positioning of an operator's hands while brushing a large flat surface.

FIG. 4 shows details of base 50 of wire brush attachment 25 in three views: top, side, and end. Base 50 is composed of plastic. Base 50 is precision molded so that cavity 65 forms a reliable press fit with flange molding 40 of adapter 20.

To form wire brush attachment 25, stiff wire bristles are imbedded at regular intervals in the top of base 50. However, many other useful attachments may be made from base 50 or minor variations of base 50. Attachments may be made with brushes of various sizes, shapes, and materials. Attachments may also be made with scrapers, scouring pads, or buffing pads. Any work accomplished by a hand tool used with a reciprocating or scrubbing motion of a human arm may be eased by an attachment to a reciprocating handheld power tool according to the present invention. One example, a scraping tool attachment, is shown in FIG. 5. The scraping tool attachment is formed by connecting a scraper blade 55 to base 50. The base 50 of each different attachment has a cavity, such as 65, for a quick and easy mounting on the support flange molding 40 and removal therefrom.

Conclusion and Variations

Adapter 20 connects to a reciprocating handheld power tool at a single point of connection using a simple established standard, such as the ½-inch universal tang used with any Milwaukee Sawzall and many compatible competitive products. The quick and easy press-fit connection of flange molding 40 into cavity 65 is very convenient for operators who need to quickly change from one application to another. Thus the present invention makes multiple applications of a reciprocating handheld power tool significantly faster and more convenient than it has been with prior art.

As an alternative, operators who work a single application for an extended period of time may prefer to have a particular attachment permanently attached to adapter 20. This configuration is included in the scope of the present invention.

The ½-inch universal tang for connection to any Milwaukee Sawzall reciprocating handheld power tool and compatible competitive products appears to be the current preferred standard for connecting saw blades to reciprocating handheld power tools. Nevertheless, the end of blade 30 which protrudes from plastic housing 35 may be readily altered to make a variation of adapter 20 which attaches to other handheld reciprocating power tools that use a connection standard different from that of the Milwaukee Sawzall.

In the light of these and other possible variations of the preferred embodiment, the scope of the present invention should be determined not by the specific descriptions above, but by the following claims.

What is claimed is:

1. For use with a handheld power tool providing a repetitive reciprocating movement of a standardized point of connection, with such standardized point of connection being adapted to receive and retain one of a plurality of attachment tools, an adapter assembly for expanding the utility of such a reciprocating handheld power tool to include a variety of tasks, including scraping, polishing, and sanding, said adapter assembly comprising:
    a main housing having a heel end and a toe end being disposed at opposing ends of said main housing and having a first truss web disposed adjacent to said toe end and a second truss web disposed adjacent to said heel end;
    a blade portion, having a portion molded inside said main housing and a portion extending from said main housing operably configured to directly engage and provide a single point of connection to said standardized point of connection; and
    a flange molding directly attached to said main housing and operably configured to directly engage one of a plurality of attachment tools,
    wherein said heel end is closer to said blade portion than said toe end, said first truss web and said second truss web being disposed between and attached to said main housing and said flange molding, wherein said first truss web and said second truss web support said flange molding from stress forces during operation of said adapter assembly.

2. The adapter assembly of claim 1 wherein said blade portion is adapted to engage the standardized point of connection of a reciprocating tool for back-and-forth motion therewith.

3. The adapter assembly of claim 1 wherein said flange molding has a flat base portion, and further including a rectangular flange portion mounted upon said flat base portion of said flange molding.

4. The adapter assembly of claim 3 wherein said rectangular flange portion is mounted centrally upon and generally perpendicular to said lat base portion of said flange molding.

5. The adapter assembly of claim 3 wherein the plane of said flat base portion of said flange molding is angled approximately six degrees from the axis of reciprocation.

6. The adapter assembly of claim 1 wherein said flange molding is operably configured to engage one of a plurality of attachment tools with a press-fit.

7. The adapter assembly of claim 1, wherein said flange molding includes a first surface and an opposing second surface, and wherein said first truss web and said second truss web are attached to said first surface of said flange molding and wherein said second surface is operably configured to engage one of the plurality of attachment tools.

8. An adapter assembly for a reciprocating power tool, wherein said tool has a body and a standardized point of connection configured to reciprocate along one axial direction, the adapter assembly comprising:
    a main housing having first and second truss webs, one of each being disposed at opposing ends of said main housing;
    a blade portion having a portion molded inside said main housing and a second portion extending from said main housing, said second portion operably configured to directly engage and provide a single point of connection to said standardized point of connection;
    a plurality of attachment tools; and,
    a flange molding removably attached to a selected one of said plurality of attachment tools,
    wherein said first and second truss webs being disposed between and attached to said main housing and said flange molding, and said first and second truss webs support said flange molding from stress forces during operation of said adapter assembly.

9. The adapter assembly of claim 8 wherein said plurality of attachment tools includes a wire brush having a plurality of stiff wire bristles.

10. The adapter assembly of claim 8 wherein said plurality of attachment tools includes a scraper tool having a scraping blade.

11. The adapter assembly of claim 8 wherein:
each of said plurality of attachment tools includes a cavity;
said flange molding has a flat base portion and a flange portion disposed on said flat base portion; and,
said cavity of said selected one of said plurality of attachment tools receives said flange portion of said flange molding.

12. The adapter assembly of claim 11 wherein said flange portion is rectangular in shape.

13. The adapter assembly of claim 8, wherein said flange molding includes a first surface and an opposing second surface, and wherein said first and second truss webs are attached to said first surface of said flange molding and wherein said second surface is operably configured to engage one of the plurality of attachment tools.

14. An adapter assembly for enabling a plurality of attachment tools to be driven by a reciprocating power tool having a standardized point of connection, said adapter assembly comprising:
a main housing having first and second truss webs, one of each being disposed at opposing ends of said main housing;
a tang having a first portion disposed inside said main housing and a second portion extending from said main housing and operably configured to engage and provide a single point of connection to the standardized point of connection of said reciprocating power tool; and
a flange molding integral with and projecting from said main housing and operably configured to engage a cavity of a selected one of a plurality of attachment tools,
wherein said first and second truss webs are disposed and attached to said main housing and said flange molding and said first and second truss webs support said flange molding from stress forces during operation of said adapter assembly.

15. The adapter assembly of claim 14 wherein said at least one truss web support includes a first and a second truss web.

16. The adapter assembly of claim 15 further comprising a heel end and a toe end, wherein said toe and heel ends are opposing ends of said adapter assembly and said heel end is closer to said tang than said toe end, and wherein said first truss web is disposed at said heel end and said second truss web is disposed at said toe end.

17. The adapter assembly of claim 14, wherein said flange molding includes a first surface and an opposing second surface, and wherein said first and second truss webs are attached to said first surface of said flange molding and wherein said second surface is operably configured to engage one of the plurality of attachment tools.

* * * * *